United States Patent [19]
Conway

[11] Patent Number: 5,777,714
[45] Date of Patent: Jul. 7, 1998

[54] EYEWEAR FRAME CONSTRUCTION

[75] Inventor: Simon M. Conway, Lima, N.Y.

[73] Assignee: Bausch & Lomb Incorporated, Rochester, N.Y.

[21] Appl. No.: 850,883

[22] Filed: May 2, 1997

[51] Int. Cl.$^6$ ................ G02C 9/00; G02C 7/08
[52] U.S. Cl. ................................. 351/47; 351/57
[58] Field of Search ..................... 351/47, 57, 58, 351/44, 41, 65, 78, 136, 138

[56] References Cited

U.S. PATENT DOCUMENTS

| | | | |
|---|---|---|---|
| D. 195,894 | 8/1963 | Petitto et al. | D57/1 |
| D. 204,496 | 4/1966 | McCulloch et al. | D57/1 |
| D. 285,310 | 8/1986 | Rocha | D16/116 |
| D. 294,595 | 3/1988 | Kanoui | D16/117 |
| D. 321,356 | 11/1991 | Daubignard et al. | D16/102 |
| D. 358,160 | 5/1995 | Conway | D16/326 |
| D. 377,365 | 1/1997 | Conway | D16/330 |
| 2,659,270 | 11/1953 | Hurst | 88/52 |
| 3,667,834 | 6/1972 | Davison et al. | 351/118 |
| 5,080,475 | 1/1992 | Ferron | 351/57 |
| 5,594,511 | 1/1997 | Lin | 351/116 |
| 5,614,964 | 3/1997 | Garneau | 351/83 |

FOREIGN PATENT DOCUMENTS

DM/035 925   3/1996   WIPO.

OTHER PUBLICATIONS

1994 Ray Ban Source Book pp. 7, 16.
1996 Ray Ban Source Book p. 10.
1997 Ray Ban Source Book p. 17.

*Primary Examiner*—Hung K. Dang
*Attorney, Agent, or Firm*—Katherine McGuire

[57] ABSTRACT

An eyewear front frame construction having first and second frame components in the form of a unitary, plastic brow bar having a pair of integral nose pads extending downwardly therefrom, and a pair of eyewires having a central bridge, respectively. The first and second frame components are attached together at primary attachment points by a pair of nose pad overlays which are affixed to the eyewires, respectively, and which align with and are secured over the nose pads which are attached to the brow bar. A pair of screws are passed through the nose pad overlays from the front and extend into the nose pads. Secondary attachment points are established by first and second tabs affixed to a respective eyewire which are inserted into a pair of recesses formed in the brow bar, and a pair screws extending therethrough which are inserted through the back surface of the brow bar.

13 Claims, 4 Drawing Sheets

EYEWEAR FRAME CONSTRUCTION

BACKGROUND OF THE INVENTION

The present invention relates to eyewear frames, and more particularly relates to a novel front frame construction for eyewear.

Eyewear styles basically include a front frame for holding one or two lenses and a pair of temples pivotally connected to either side of the front frame. The front frame and temples may be made of any desired material or combinations thereof (e.g., metal and plastics). There are a variety of known techniques for securing the eyewear components together. For example, in a metal front frame, it is common to form a pair of eyewires which are each split and include a groove traversing the inside edge thereof. To insert a lens, the eyewire is temporarily spread apart and the beveled lens edge is inserted into the inner eyewire groove. The free ends of the eyewire are then brought together and secured, usually with a screw and barrel element called a "rim lock" in the art. In this way, the eyewire secures the lens to the front frame. A bridge element extends between and joins the eyewire pair to form a full front frame.

Combining a metal front frame with additional frame elements (e.g., a brow bar which extends across the top of the front frame) formed of a different material (e.g., plastic) may be aesthetically desirable, but difficult to manufacture due to a lack of mechanical affinity between the different materials which have different rates of thermal expansion, for example. Further, eyewear must be able to withstand a variety of stresses, both mechanical and environmental in nature. It is thus very important to secure the various components of an eyewear together in a precise and mechanically reliable manner. When using two or more different materials, the manner of attaching the components together becomes even more critical due to the factors enumerated above.

SUMMARY OF THE INVENTION

The present invention provides a method for securing multiple front frame components of an eyewear together in an attractive and mechanically strong and reliable manner. The invention is particularly useful in front frame constructions having components formed of different materials.

More particularly, the front frame of the invention comprises a first major frame component in the form of a unitary brow bar and nose pad structure, and a second major frame component which includes a pair of members forming the right and left eye openings in which a respective pair of lenses are secured. In the preferred embodiment of the invention, the first frame component is formed of molded plastic while the second frame component is formed from metal. The eye openings of the second front frame component are joined together by a bridge component. A pair of nose pad overlays are also brazed or otherwise affixed to either eye opening in the nasal area. A pair of metal tabs are affixed to and extend upwardly from the top extent of a respective eye opening. To attach the first and second frame components together, the metal tabs on the eye openings are first inserted into a pair of respectively aligned recesses formed in the lower edge of the brow bar of the first frame component. A pair of holes which align with the metal tabs of the eye openings are formed through the rear wall surface of the brow bar with a pair of screws being respectively inserted through the holes and metal tabs from the rear surface of the brow bar. A pair of holes are likewise formed through each of the nose pad overlays of the second frame component which align with a pair of holes formed in each of the nose pads of the first frame component. Screws are respectively inserted through the aligned holes in the nose pad overlays and nose pads, with the screws being inserted from the front of the nose pad overlays. The provision of nose pad overlays affixed to the eye opening members which attach to the nose pads of the brow bar structure provides for a very secure attachment between the plastic brow bar/nose pad structure and the metal eye opening member/nose pad overlay structure. Having two additional points of attachment at the brow bar area provides a strong, mechanically reliable front frame construction.

DETAILED DESCRIPTION

Figure 1:
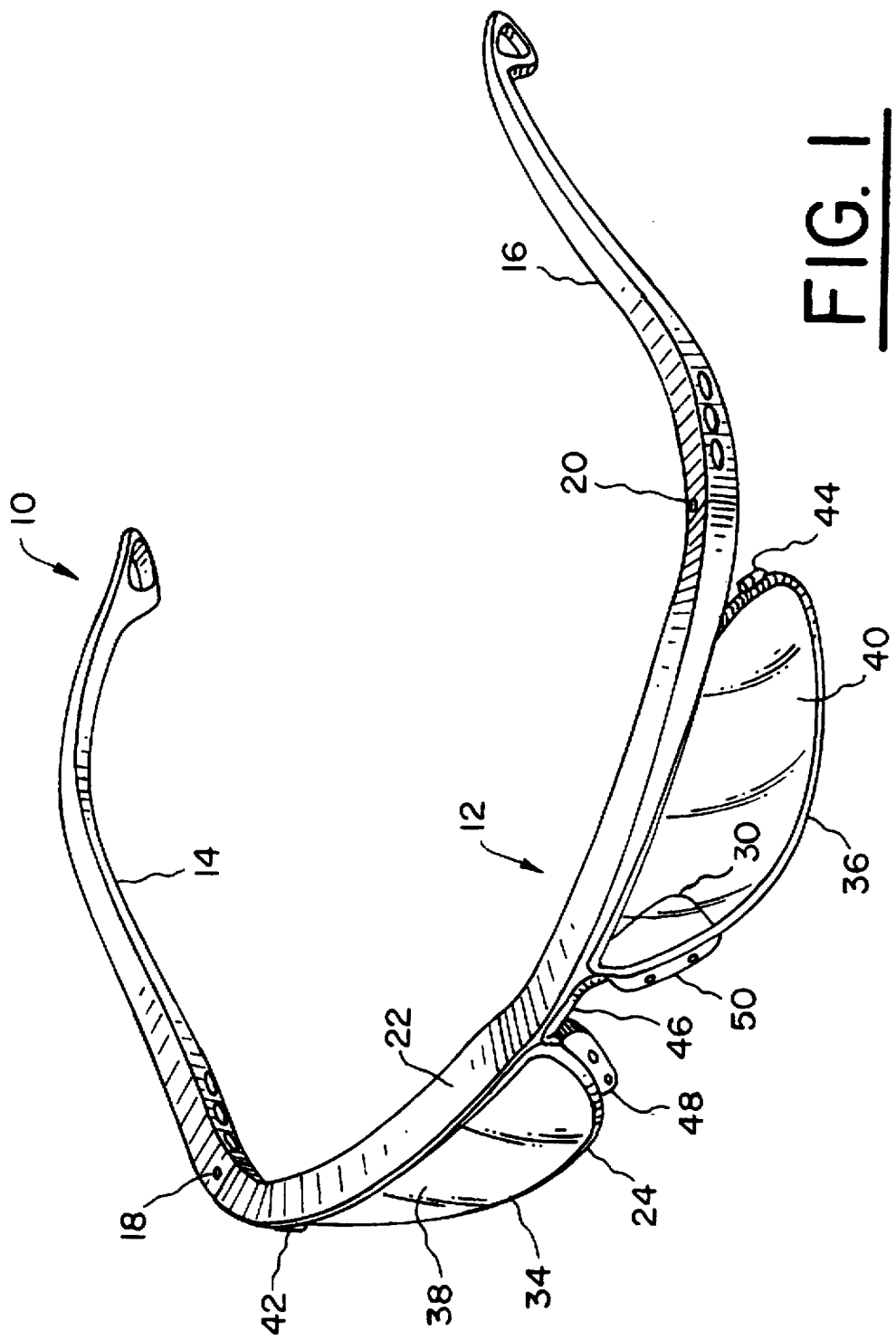
FIG. 1 is a front, perspective view of an eyewear construction in accordance with the invention herein.

Referring to the drawing, there is seen in the Figures an eyewear 10 having a front frame 12 and a pair of temple members 14, 16 pivotally connected to either lateral side of front frame 12 via hinge screws 18, 20, respectively, although other hinge connections may be used if desired. Front frame 12 includes first and second, major frame components 22, 24, respectively, which are secured together to form front frame 12. More particularly, first frame component 22 includes an elongated brow bar 26 and a pair of nose pads 28, 30 extending downwardly from the bottom wall 32 of brow bar 26. Although first frame component 22 may be made of any desired material, in the preferred embodiment, it is formed from a molded, soft plastic piece.

Second frame component 24 includes a pair of members defining eye openings in the form of eyewires 34, 36 for capturing a pair of lenses 38, 40 therein, respectively. In this regard, eyewires 34, 36 include a pair of rim locks 42, 44 at the outer edges thereof for securing the free ends of the split eyewires 34, 36 about lenses 38, 40. A bridge 46 extends between and is affixed to each eyewire 34, 36. Also, a pair of nose pad overlays 48, 50 in the same general outline as nose pads 28, 30 are affixed to a respective eye opening 34, 36 along the nasal areas thereof. Although second frame component 24 may be made of any desired material or combinations thereof, in the preferred embodiment, second frame component 24 is formed entirely of metal.

Figure 2:
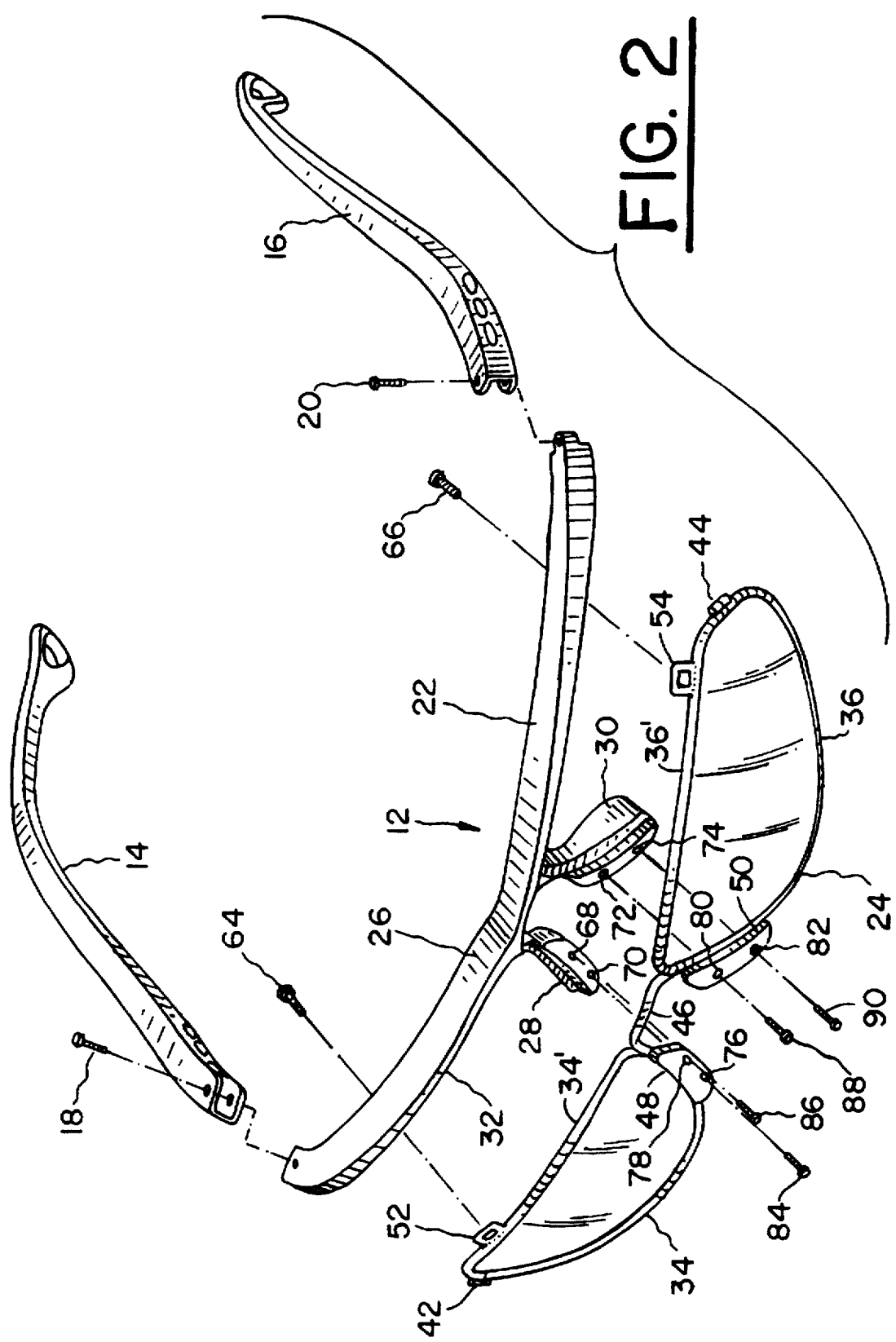
FIG. 2 is an exploded front perspective view thereof.

The manner of attaching the first and second frame components 22, 24 together will now be described (see particularly FIG. 2).

Figure 4:
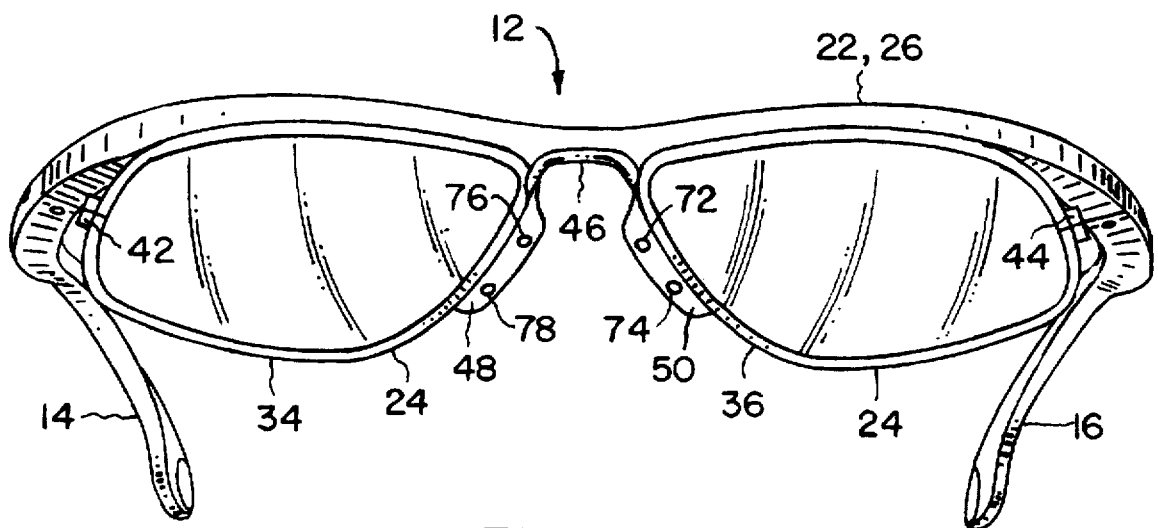
FIG. 4 is a front, elevations view of FIG. 1.
Figure 5:
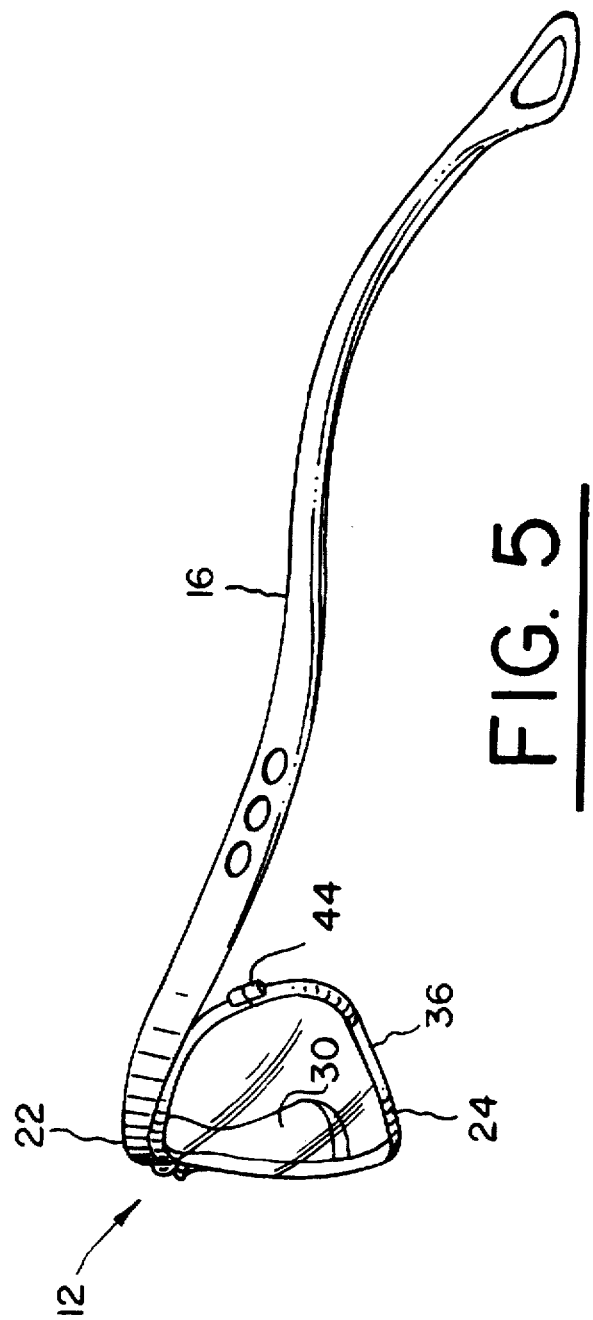
FIG. 5 is a side elevational view thereof.

Primary attachment points are established in the nose pad area. More particularly, as seen in FIG. 2, a pair of holes 68, 70 and 72, 74 are formed through each nose pad 28, 30, respectively, of first frame component 22. Likewise, a pair of through holes 76, 78 and 80, 82, which align with holes 68, 70 and 72, 74, respectively, are formed through nose pad overlays 48, 50 of second frame component 24. Thus, holes 76, 78 of nose pad overlay 48 are aligned with holes 68, 70 of nose pad 28, and the holes 80, 82 in nose pad overlay 50 are aligned with and then secured to holes 72, 74 in nose pad 30. Securing means are provided with a pair of screws 84, 86 which are passed through lower and upper hole pairs 78, 70 and 76, 68, and hole pairs 82, 74 and 80, 72 in nose pad overlay 48 and nose pad 28, respectively, thereby establishing the aforesaid primary attachment points between the first and second frame components 22, 24. As seen in FIG. 4, screws 84, 86, 88 and 90 are visible from the front for aesthetic purposes, although these screws may of course also be hidden if desired through the use of an additional overlay or other covering thereover.

Figure 3:
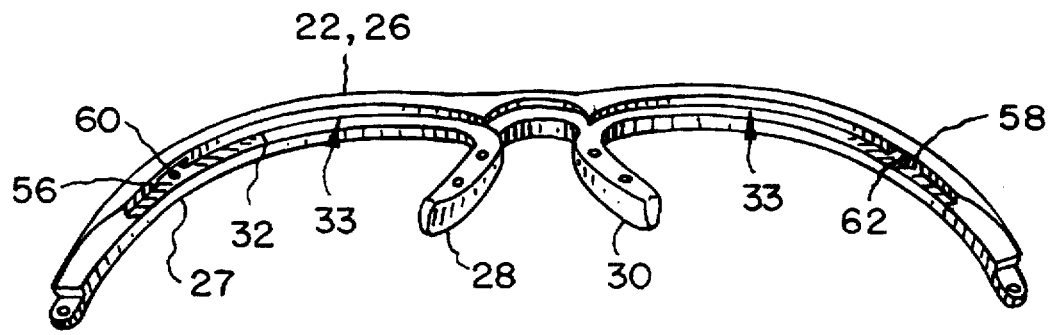
FIG. 3 is a bottom perspective view of the first frame component.

Secondary attachment points are established along brow bar 26 by a pair of metal tabs 52, 54 which are affixed (e.g., by brazing) to the upper extents 34', 36' of eyewires 34, 36, respectively. Metal tabs 52, 54 align with a pair of respective recesses 56, 58 formed in the bottom wall surface 32 of brow bar 26 (see FIG. 3). Metal tabs 52, 54 are thus inserted into recesses 56, 58 with the upper extents 34', 36' of eyewires 34, 36 extending within the stepped ledge 33 traversing the bottom wall surface of brow bar 26. It is noted in the preferred embodiment shown in the drawing, bridge 46 also lies within stepped ledge 33 which is contoured to follow the contour of the upper extents and bridge component of the second frame component 24. Each metal tab 52, 54 includes a central opening which aligns with a pair of respective holes 60, 62 (FIG. 3) formed through the brow bar back wall surface 27 at recesses 56, 58. As seen in FIG. 2, a pair of screws 64, 66 are provided which are passed through the back wall surface 27 of brow bar 26 and extend through the aligned hole and tab pairs 60, 52 and 58, 54, respectively, thereby establishing the aforesaid secondary attachment points between the first and second frame components 22, 24. Since the screws 64, 66 pass through the back surface 27 of brow bar 26, they are hidden from view while wearing the eyewear 10.

While the invention has been described with particular reference to a preferred embodiment thereof, it is understood that various modifications may be made thereto without departing from the scope of the invention as defined in the claims which follow.

What is claimed is:

1. In an eyewear frame, a method for attaching a first front frame component having an elongated brow bar to a second frame component having first and second members defining first and second eye openings, respectively, said first and second members each having an upper extent, said method comprising the steps of:

a) providing first and second nose pads on and extending downwardly from said brow bar;

b) providing first and second nose pad overlays on said first and second members of said second frame component;

c) aligning said first and second nose pad overlays over said first and second nose pads, respectively; and d) securing said nose pad overlays to said first and second nose pads, respectively, thereby establishing primary attachment points between said first and second frame components.

2. The method of claim 1 wherein said first and second frame components are formed of different materials.

3. The method of claim 2 wherein said first frame component is formed of plastic and second frame component is formed of metal.

4. The method of claim 1 and further comprising the steps of:

(a) providing first and second tab components on said first and second upper extents;

(b) providing first and second recesses in said brow bar; and (c) inserting and securing said first and second tabs into said first and second recesses, thereby establishing secondary attachment points between said first and second frame.

5. The method of claim 4 wherein said first frame component is formed of plastic and second frame component is formed of metal.

6. The method of claim 5 wherein said primary and secondary attachment points are established with screws.

7. The method of claim 6 wherein said rear brow bar has a rear surface and a pair of screws are passed through said rear surface into said recesses and through said metal tabs to establish said secondary attachment points between said first and second frame component.

8. The method of claim 7 wherein at least one screw is passed through each of said aligned nose pad overlays and nose pads to establish said primary attachment points between said first and second frame components.

9. The method of claim 8 wherein said at least one screw is passed through said nose pad overlay first and is visible to a person facing the nose pad overlay.

10. An eyewear front frame construction comprising:

a) a first frame component in the form of an elongated brow bar having rear and bottom wall surfaces, and first and second nose pads integrally formed with and extending downwardly from said bottom wall surface of said brow bar;

b) a second frame component including first and second members defining first and second eye openings joined by a bridge, and further including a pair of nose pad overlays affixed to said first and second members, respectively, said nose pad overlays aligned over and secured to said nose pads on said first frame component, respectively, thereby establishing primary attachment points between said first and second frame components.

11. The eyewear front frame construction of claim 10, wherein said first and second members each include an upper extent having a tab projecting upwardly therefrom, and further including a pair of recesses formed in said bottom wall surface of said brow bar, said tabs being inserted and secured within said recesses, respectively, whereby secondary attachment points are established between said first and second frame component.

12. The eyewear front frame construction of claim 11 wherein said first frame component is formed of plastic and said second frame component is formed of metal.

13. The eyewear front frame construction of claim 12 wherein a pair of screws are passed through each of said nose pad overlays and extend into said nose pads, respectively.

* * * * *